Aug. 15, 1967

C. F. ALBAN ETAL 3,335,608

TEMPERATURE COMPENSATED ELEMENT FOR SENSING AND
CONTROLLING HUMIDITY CHANGES

Filed Oct. 16, 1964

INVENTORS
CLARENCE F. ALBAN
CHARLES C. PERRY

BY *Olsen and Stephenson*
ATTORNEYS

INVENTORS
CLARENCE F. ALBAN
CHARLES C. PERRY
BY Olsen and Stephenson
ATTORNEYS

United States Patent Office 3,335,608
Patented Aug. 15, 1967

3,335,608
TEMPERATURE COMPENSATED ELEMENT
FOR SENSING AND CONTROLLING HU-
MIDITY CHANGES
Clarence F. Alban, Detroit, and Charles C. Perry, Ann
Arbor, Mich., assignors to W. M. Chace Company,
Detroit, Mich., a corporation of Delaware
Filed Oct. 16, 1964, Ser. No. 404,260
15 Claims. (Cl. 73—337)

This invention relates generally to elements for sensing and controlling humidity changes and more particularly to an improved element of the type which is unaffected by changes in temperature in the ambient environment.

A unitary element capable of sensing and controlling humidity changes in the ambient environment is desirable for humidity indicating instruments and humidity control instruments for room and industrial purposes. Elements intended for these purposes have in the past inherently responded also to changes in ambient temperature, thereby necessitating the inclusion of a separate temperature compensating mechanism or rendering the instrument inaccurate over a range of temperatures. It is an object of this invention to provide a unitary multi-layer element which senses and is capable of controlling changes in ambient humidity and which incorporates temperature compensation so that changes in ambient temperature do not affect its response to humidity changes.

A further object of this invention is to provide a temperature compensated humidity sensing element which is constructed so as to approach a maximum sensitivity to humidity changes.

The element of this invention can be termed a sandwich consisting of a plurality of elongated layers of different materials which are intimately secured together along their contiguous surfaces so that a change in length of one layer causes bending or lateral deflection of the element. The materials from which the layers are formed and the dimensional proportions of the layers are pre-selected in accordance with a formula hereinafter set forth so that a change in ambient temperature does not cause may deflection of the element. Such a change in temperature causes a change in the lengths of all of the layers, which cannot be avoided, but because of the relative temperature response characteristics of the layers, such a length change does not cause any bending or deflection of the element. This characteristic bending or deflection of the element signals a change only in ambient humidity conditions.

Further objects, features and advantages of this invention will become apparent from a consideration of the following description, the appended claims, and the accompanying drawing in which:

FIGURE 1 is a perspective view of one embodiment of the laminated element of this invention;

FIGURE 2 is a diagrammatic view illustrating the increased length of each of the laminations in the element of this invention caused by an arbitrary combination of humidity and temperature changes in the ambient environment, the laminations being shown separated only because a momentary consideration of the laminations in this condition facilitates synthesizing of the equation which enables prediction of element response to humidity and temperature changes;

Figure 1:
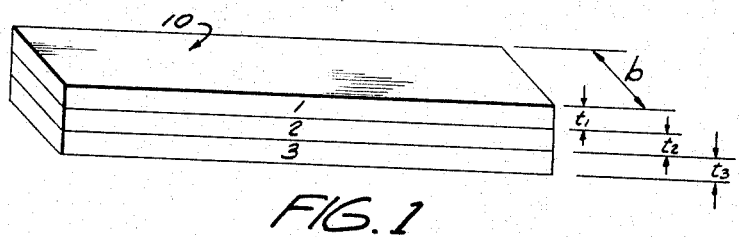

With reference to the drawing, the laminated element of this invention, indicated generally at 10, is illustrated in FIG. 1 as consisting of three laminations or layers 1, 2 and 3 of material such as metal or plastic as explained more in detail hereinafter. The layers 1, 2 and 3 are arranged in a sandwich form and contiguous surfaces of adjacent layers are intimately secured together throughout their extent by any suitable means such as a suitable adhesive. The relative dimensions of the layers to accomplish temperature compensation as described above is as follows:

Assume that all layers have the same width $b$ and length $L$. Each layer is characterized by the following three properties of significance:

$E$=modulus of elasticity, pounds per square inch.

$\alpha$=coefficient of linear thermal expansion, inches expansion per inch per degree F.

$\beta$=coefficient of linear hygroscopic expansion, inches expansion per inch for one percent change in relative humidity.

Figure 2:
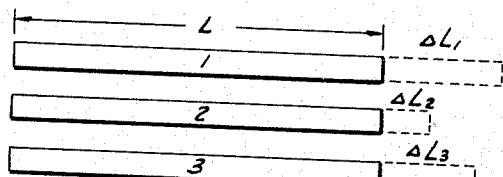

Assume for the moment that the laminations 1, 2 and 3 are independent of each other as shown diagrammatically in FIG. 2. Further assume that after a change in temperature $\Delta T$ and a change in humidity $\Delta H$, the layers have increased in length as shown in broken lines at $\Delta L_1$, $\Delta L_2$ and $\Delta L_3$ in FIG. 2. These increases can be computed as follows:

$$\Delta L_1 = L(\alpha_1 \Delta T + \beta_1 \Delta H)$$

$$\Delta L_2 = L(\alpha_2 \Delta T + \beta_2 \Delta H)$$

$$\Delta L_3 = L(\alpha_3 \Delta T + \beta_3 \Delta H)$$

where the numeral subscript in each case denotes the property of the layer identified by the corresponding numeral.

Figure 3:
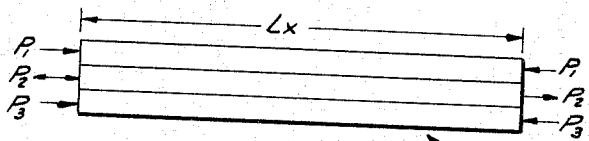
FIGURE 3 is a diagrammatic view illustrating the increased length of the laminated element of this invention caused by the conditions illustrated in FIG. 2, with the laminations secured so that the element acts as an integral whole.

Since the laminations 1, 2 and 3 are secured along their contiguous surfaces, axial forces $P_1$, $P_2$ and $P_3$ (FIG. 3) have been generated by $\Delta T$ and $\Delta H$. The forces $P_1$, $P_2$ and $P_3$ maintain the layers of the same, but a greater length $L_x$ than originally. Also, the algebraic sum of force $P_1$, $P_2$ and $P_3$ must be zero since the element 10 is in equilibrium. Therefore:

$$P_1 + P_3 - P_2 = 0$$

However, these forces do cause curving of the element 10 since the bending moment about a given plane, for example the centroidal axis of layer 1, is not zero. Assuming a concave upward, as viewed in FIG. 3, curving of element 10 as positive, this moment can be expressed as:

$$M = P_2\left(\frac{t_1}{2} + \frac{t_2}{2}\right) - P_3\left(\frac{t_1}{2} + t_2 + \frac{t_3}{2}\right)$$

Since element 10 is in equilibrium, the sum of internal resisting moments $M_1$, $M_2$ and $M_3$ in layers 1, 2 and 3 is equal to the external moment M. Thus:

$$M = M_1 + M_2 + M_3$$

Figure 4:
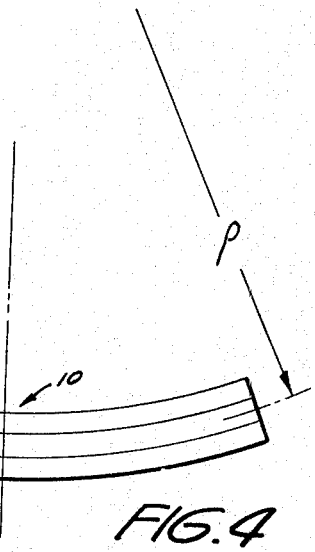
FIGURE 4 is a diagrammatic view showing the change in curvature of the element of this invention resulting from a change in ambient humidity conditions.

For the small deflections involved in element 10, the radius of curvature $\rho$ is very large with respect to element thickness $t$ (FIG. 4). Therefore, the radius of curvature $\rho$ for each layer can be assumed to be the same. As a result:

$$M_1 = \frac{E_1 I_1}{\rho}; \quad M_2 = \frac{E_2 I_2}{\rho}; \quad M_3 = \frac{E_3 I_3}{\rho}$$

where $I$ = moment of inertia of a layer about its own centroidal axis. Thus:

$$\frac{1}{\rho}(EI) = M$$

$$\frac{1}{\rho}(E_1 I_1 + E_2 I_2 + E_3 I_3) = P_2\left(\frac{t_1}{2} + \frac{t_2}{2}\right) - P_3\left(\frac{t_1}{2} + t_2 + \frac{t_2}{2}\right) \quad (1)$$

The adjacent fibers at the interface between adjacent layers must undergo the same deformation. Each fiber expands or contracts a distance determined by the algebraic sum of the following four expansion or contraction effects:

(1) Thermal—$\alpha_i \Delta T$,
(2) Hygroscopic expansion—$\beta_i \Delta H$,
(3) The force $$P_i - \frac{P_i}{E_i b t_i}$$

(4) The strain as a result of bending—$\epsilon_i$ where the subscript $i$ denotes any layer, and where "$b$" is the width of the element, as shown in FIG. 1.

Thus:

$$\alpha_1 \Delta T + \beta_1 \Delta H - \frac{P_1}{E_1 b t_1} + \epsilon_1 = \alpha_2 \Delta T + \beta_2 \Delta H + \frac{P_2}{E_2 b t_2} - \epsilon_2 \quad (2)$$

and $$\alpha_2 \Delta T + \beta_2 \Delta H + \frac{P_2}{E_2 b t_2} + \epsilon_2 = \alpha_3 \Delta T + \beta_3 \Delta H - \frac{P_3}{E_3 b t_3} - \epsilon_3 \quad (3)$$

Figure 5:
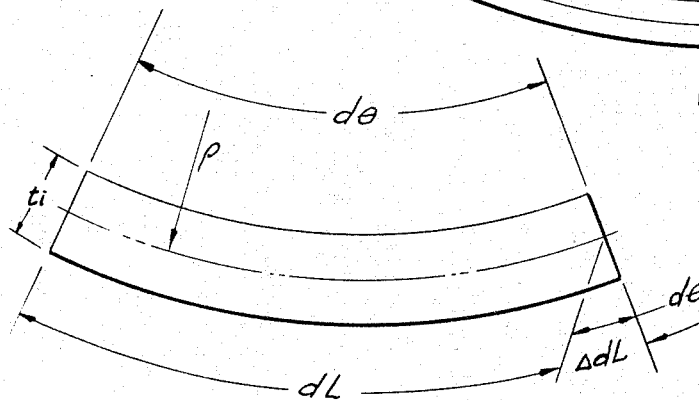
FIGURE 5 is a diagrammatic view similar to FIG. 4 illustrating the change in curvature of a single lamination in the element of this invention in response to a change in ambient humidity conditions.

As shown in FIG. 5, and assuming curvature of element 10 is small, comparing similar triangles:

$$\frac{\Delta dL}{dL} = \frac{\frac{t_1}{2}}{\rho}$$

Also:

$$\frac{\Delta dL}{dL} = \epsilon_1$$

Thus:

$$\epsilon_1 = \frac{\frac{t_1}{2}}{\rho} \quad (4)$$

Substituting Equation 3 into Equations 1 and 2 and converting to the following dimensionless expressions:

$$\frac{t_1}{t} = A \quad \frac{t_2}{t} = B \quad \frac{t_3}{t} = C$$

$$\frac{E_1}{E_2} = D \quad \frac{E_2}{E_2} = 1 \quad \frac{E_3}{E_2} = G$$

and solving for $$\frac{1}{\rho}$$

in Equation 1, the following expression is obtained:

$$\frac{1}{\rho} = \frac{6\left\{\begin{matrix}[\Delta T(\alpha_2 - \alpha_1) + \Delta H(\beta_2 - \beta_1)]Q + \\ [\Delta T(\alpha_3 - \alpha_2) + \Delta H(\beta_3 - \beta_2)_R]\end{matrix}\right\}}{t[Z + 3(A+B)Q + 3(1-A)R]} \quad (5)$$

where $$Q = DA[B(A+B) + GC(B+1)]$$
$$R = GC[B(1-A) + DA(B+1)]$$
$$Z = (DA^3 + B^3 + GC^3)(DA + B + GC)$$

Equation 5 is the general expression for the change in curvature of any three layered element in which one or more of the component layers is subject to dimensional changes as a result of both temperature and humidity changes. In the present invention, for no change in humidity ($H=0$) the change in curvature must be zero, irrespective of temperature change.

Thus introducing $\Delta H = 0$ into Equation 5 and setting the result equal to zero, $$\frac{Q}{R} = -\frac{(\alpha_3 - \alpha_2)}{(\alpha_2 - \alpha_1)} \quad (6)$$

The expression for change in curvature in this case then becomes:

$$\frac{1}{\rho} = \frac{6R\Delta H}{t}\left[\frac{(\beta_3 - \beta_2) - (\beta_2 - \beta_1)\frac{\alpha_3 - \alpha_2}{\alpha_2 - \alpha_1}}{Z + 3R\left[1 - A - (A+B)\frac{\alpha_3 - \alpha_2}{\alpha_2 - \alpha_1}\right]}\right] \quad (7)$$

Equation 7 is thus the general expression for the change in curvature of any three-layered element 10 in which the proportions and properties of the element have been selected to satisfy Equation 6 to insure complete insensitivity to temperature changes.

In the present invention the fractional thicknesses A, B and C of the layers 1, 2 and 3 are proportioned to obtain maximum response to humidity changes while remaining unaffected by temperature changes. This proportioning is accomplished as follows:

Since $C = 1 - (A+B)$, the functions Q and R can be expressed in terms of A and B only. Solving then for A in terms of B it is found that:

$$A = \frac{-S \pm \sqrt{T - 4U}}{V} \quad (8)$$

in which:

$$S = DB^2 + DG(1-B^2)\left(1 + \frac{\alpha_3 - \alpha_2}{\alpha_2 - \alpha_1}\right)$$
$$+ (GB^2 - 2GB)\left(\frac{\alpha_3 - \alpha_2}{\alpha_2 - \alpha_1}\right)$$

$$T = \left[DB^2 + DG(1-B^2)\left(1 + \frac{\alpha_3 - \alpha_2}{\alpha_2 - \alpha_1}\right) \right.$$
$$\left. + (GB^2 - 2GB)\left(\frac{\alpha_3 - \alpha_2}{\alpha_2 - \alpha_1}\right)\right]^2$$

$$U = \left[DB - DG(B+1)\left(1 + \frac{\alpha_3 - \alpha_2}{\alpha_2 - \alpha_1}\right) \right.$$
$$\left. + GB\left(\frac{\alpha_3 - \alpha_2}{\alpha_2 - \alpha_1}\right)\right]\left[GB(1-B)\left(\frac{\alpha_3 - \alpha_2}{\alpha_2 - \alpha_1}\right)\right]$$

$$V = 2\left[DB - DG(B+1)\left(1 + \frac{\alpha_3 - \alpha_2}{\alpha_2 - \alpha_1}\right) + GB\left(\frac{\alpha_3 - \alpha_2}{\alpha_2 - \alpha_1}\right)\right]$$

Equation 8 allows the determination of the fractional thickness A, and thus C, once the properties of the three layers are specified and a value of B is selected. In order to select B so as to yield maximum sensitivity of element 10 to humidity changes, C is first eliminated from R and Z in Equation 7 by replacing it with $[1-(A+B)]$. Equation 8 is then substituted into the result to eliminate A, leaving an expression for the change in curvature as a function of only B and the properties of the component materials. Symbolically such an equation appears as:

$$\frac{1}{\rho} = f(B, D, G, \alpha_1, \alpha_2, \alpha_3, \beta_1, \beta_2, \beta_3) \quad (9)$$

where "$f$" means "a function of."

Equation 9 can be differentiated with respect to B and the result set equal to zero to solve for B*, which is B* for maximum sensitivity to humidity change.

This differentiation produces an equation which cannot be solved explicitly for B*. It is necessary, therefore, to solve numerically by substituting specific values for the properties of the materials in Equation 9, then successively substitute values of B and solve for the corresponding changes in curvature $$\frac{1}{\rho}$$

Figure 6:
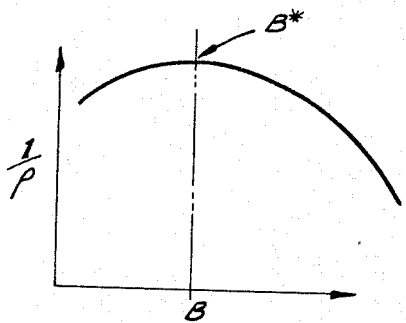
FIGURE 6 illustrates a graph which is plotted to obtain particular conditions in one embodiment of the laminated element of this invention.

The numerical results are plotted as in FIG. 6 to determine the value of B giving the greatest curvature. This plotting is repeated for other combinations of materials o rof ranges of material properties considered suitable.

As specific examples:

*Example I*

Layer 1 is a hygroscopic material (such as a plastic of the nylon family, namely, Capran, a flexible thermoplastic film or sheet made by Allied Chemical Corporation, General Chemical Division, Chicago, Ill., U.S.A. Capran is made from nylon-6 resin, specifically a polymer of ε-caprolactam).

Layer 2 is a metal having a relatively low coefficient of thermal expansion such as a 36% Ni–64% Fe alloy.

Layer 3 is a metal having a relatively high coefficient of thermal expansion such as a 22% Ni, 3% Cr, 75% Fe alloy.

In this case, the metals are non-hygroscopic so $$\beta_2 = \beta_3 = 0$$

Equation 7 in this case then becomes:

$$\frac{1}{\rho} = \frac{6R\Delta H \beta_1}{t} \left[ \frac{\frac{\alpha_3 - \alpha_2}{\alpha_2 - \alpha_1}}{Z + 3R\left[1 - A - (A+B)\frac{\alpha_3 - \alpha_2}{\alpha_2 - \alpha_1}\right]} \right] \quad (10)$$

A graph like FIG. 6 is then plotted for each group of materials selected to obtain B*.

*Example II*

Layer 1 is the same as in Example I.
Layer 2 is metal.
Layer 3 is the same as layer 1 provided with a thin moisture impervious coating which renders layer 3 non-hygroscopic.

In this case:

$$\beta_2 = \beta_3 = 0$$
$$\alpha_1 = \alpha_3$$
$$E_1 = E_3$$
$$D = G$$

Thus:

$$\frac{\alpha_3 - \alpha_2}{\alpha_2 - \alpha_1} = \frac{\alpha_3 - \alpha_2}{\alpha_2 - \alpha_3} = -1$$

Substituting in Equation 6, then $$Q = R$$

Then solving for A and C it is found that:

$$A = C = \frac{1-B}{2}$$

As a result, layers 1 and 3 must be of the same thickness. To determine the thickness of layer 2 in terms of the material constants to maximize sensitivity of element 10 to humidity, Equation 5 in this case simplifies to:

$$\frac{1}{\rho} = -\frac{6\Delta H R \beta_1}{t[Z + 3R(B+1)]} \quad (11)$$

The negative sign in Equation 11 indicates that for an increase in relative huimidity, the deflection of element 10 is downward instead of upward in this example. In other words, the curvature of element 10 is opposite to that shown in FIG. 4.

Figure 7:
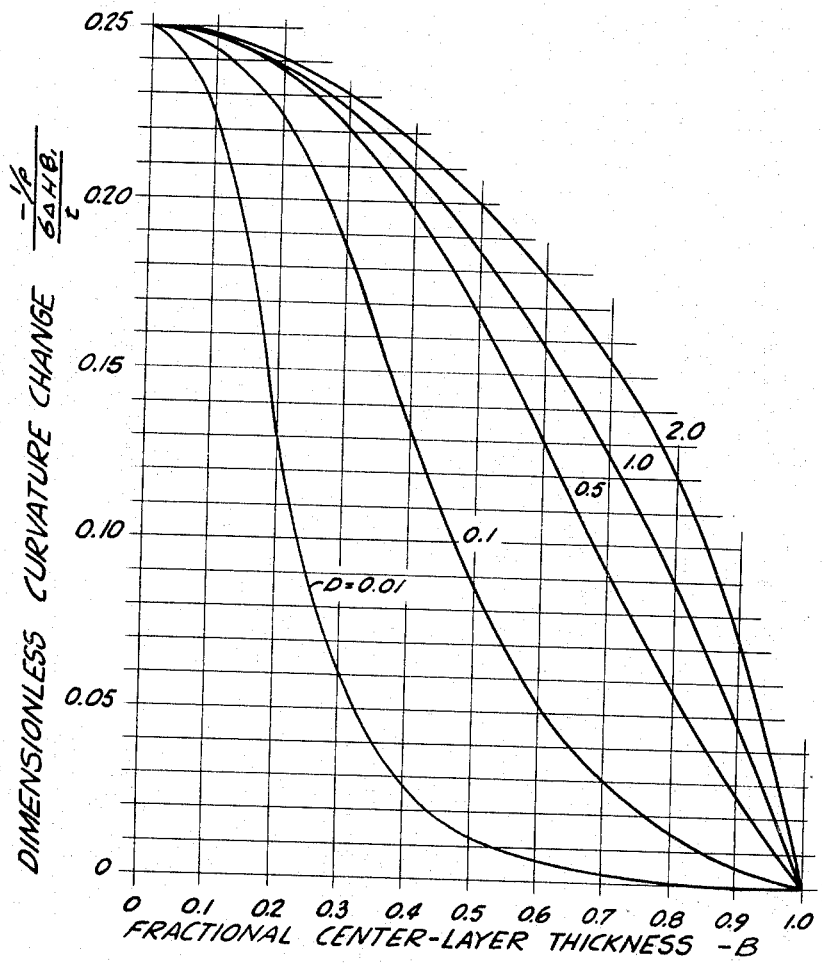
FIGURE 7 is an illustration of another graph which is plotted to obtain particular conditions in another embodiment of the temperature compensated humidity sensing element of this invention.

Equation 11 must be solved numerically to determine the fractional thickness of layer 2 which produces greatest sensitivity to humidity change. When these numerical computations are plotted a curve having the general form of that shown in FIG. 7 is obtained for each value of D chosen. Each such curve has its maximum, or B*, at $B=0$. As a result, the thickness of layer 2 is maintained as small as possible consistent with the practical demands on element 10. In other words for reasons of electrical conductivity, mechanical spring rate, etc., the thickness of layer 2 may have to be greater than desired for maximum sensitivity of element 10 to humidity changes. However, FIG. 7 illustrates that when the thickness of layer 2 is on the order of ten percent of the total thickness of element 10, a sensitivity to moisture change is obtained which is a practical maximum. In any case, a curve of the type shown in FIG. 7 is useful in determining the thickness of layer 2 which can be used without a serious reduction in sensitivity to humidity of element 10.

From the above description it is seen that this invention provides a temperature compensated humidity sensor which consists of the single unitary element 10. By virtue of the construction of element 10 in a single strip form, it is readily manufactured as a compact component suitable for substantially any installation requiring humidity sensing or control.

By constructing element 10 to satisfy Equation 7, a preselected change in curvature for a given $\Delta H$ can be obtained, while maintaining the element unresponsive to temperature changes. In the event maximum sensitivity to humidity is desired, numerical values are used in Equation 9 to plot a curve as in FIG. 6, from which the necessary dimensions for the layers 1, 2 and 3 are obtainable. In the case of the specific example outlined in Examples I and II, Equations 10 and 11, respectively, are used to plot curves to obtain the necessary proportions.

It will be understood that the temperature compensated element for sensing and controlling humidity changes which is herein disclosed and described is presented for purposes of explanation and illustration and is not intended to indicate limits of the invention, the scope of which is defined by the following claims.

What is claimed is:

1. A laminated element for sensing changes in ambient humidity conditions comprising three laminations arranged in surface-to-surface contact and secured together over the entire area of their contiguous surfaces so that the laminated element acts as an integral whole, all of said laminations being of substantially the same lengths and widths and at least one of said laminations being formed of a hygroscopic material which changes dimensions in response to changes in humidity conditions to thereby change the curvature of said element, said laminations being constructed of materials and having thicknesses proportioned substantially according to the following expression:

$$\frac{1}{\rho} = \frac{6R\Delta H}{t} \left[ \frac{(\beta_3-\beta_2)-(\beta_2-\beta_1)\frac{\alpha_3-\alpha_2}{\alpha_2-\alpha_1}}{Z + 3R\left[1 - A - (A+B)\frac{\alpha_3-\alpha_2}{\alpha_2-\alpha_1}\right]} \right]$$

where:

$\rho$ = radius of curvature of said element,
$R = GC[B(1-A) + DA(B+1)]$,
$\Delta H$ = change in humidity,
$t$ = total thickness of said element,
$\beta$ = coefficient of linear hygroscopic expansion,
$\alpha$ = coefficient of linear thermal expansion,
$Z = (DA^3 + B^3 + GC^3)(DA + B + GC)$,
$A = t_1/t$,
$B = t_2/t$,
$C = t_3/t$,
$D = E_1/E_2$,
$E$ = modulus of elasticity,
$G = E_3/E_2$,
numerical subscripts refer to particular laminations, whereby a predetermined change in curvature of said element is obtained for a given change in humidity without substantially any change in curvature in response to changes in ambient temperature.

2. The laminated element of claim 1 wherein said layer formed of a hygroscopic material is a nylon material and at least one of the remaining two laminations is formed of metal.

3. The laminated element of claim 1 wherein the center lamination in said element is formed of metal, one of the outer laminations is formed of a hygroscopic plastic material, and the other outer lamination is formed of a non-hygroscopic material.

4. A laminated element for sensing changes in ambient humidity conditions comprising three laminations arranged in surface-to-surface contact and secured together over the entire area of their contiguous surfaces so that the laminated element acts as an integral whole, all of said laminations being of substantially the same lengths and widths, lamination number 1 constituting one outer surface of said element and being formed of a hygroscopic material which changes dimensions in response to changes in humidity conditions, lamination number 2 being secured to one side of said lamination number 1 and being formed of a metal having a relatively low coefficient of thermal expansion, and lamination number 3 being secured to lamination number 2 and being formed of a metal having a higher coefficient of thermal expansion than layer number 2, said element being subject to change in curvature measured in a direction laterally thereof in response to change in ambient humidity, said laminations being constructed of materials and having their thicknesses proportioned according to the following expression:

$$\frac{1}{\rho} = \frac{6R\Delta H \beta_1}{t} \left[ \frac{\frac{\alpha_3 - \alpha_2}{\alpha_2 - \alpha_1}}{Z + 3R\left[1 - A - (A+B)\frac{\alpha_3 - \alpha_2}{\alpha_2 - \alpha_1}\right]} \right]$$

where:

$\rho$ = radius of curvature of said element,
$R = GC[B(1-A) + DA(B+1)]$,
$\Delta H$ = change in humidity,
$t$ = total thickness of said element,
$\beta$ = coefficient of linear hygroscopic expansion,
$\alpha$ = coefficient of linear thermal expansion,
$Z = (DA^3 + B^3 + GC^3)(DA + B + GC)$,
$A = t_1/t$,
$B = t_2/t$,
$C = t_3/t$,
$D = E_1/E_2$,
$E$ = modulus of elasticity,
$G = E_3/E_2$,
numerical subscripts refer to particular laminations, whereby a predetermined change in curvature of said element is obtained for a given change in humidity without substantially any change in curvature in response to changes in ambient temperature.

5. The laminated element of claim 4 having said laminations proportioned as to the thicknesses thereof to obtain a maximum change in curvature for a given change in ambient humidity.

6. The laminated element of claim 5 in which lamination number 1 is formed of a plastic of the nylon family.

7. A laminated element for sensing changes in ambient humidity conditions comprising three laminations arranged in surface-to-surface contact and secured together over the entire area of their contiguous surfaces so that the laminated element acts as an integral whole, all of said laminations being of substantially the same lengths and widths, lamination number 1 constituting one outer surface of said element and being formed of a hygroscopic material which changes dimensions in response to changes in humidity conditions, lamination number 2 being secured to one side of said lamination number 1 and being formed of a metal, lamination number 3 constituting the other outer side of said element and being formed of the same material as lamination number 1, a moisture impervious coating on the exposed surfaces of lamination number 3 rendering said lamination non-hygroscopic, said element being subject to change in curvature measured in a direction laterally thereof in response to change in ambient humidity, said laminations being constructed of materials and having thicknesses proportioned according to the following expression:

$$\frac{1}{\rho} = \frac{6 \Delta H R \beta_1}{t[Z + 3R(B+1)]}$$

where:

$\rho$ = radius of curvature of said element,
$R = GC[B(1-A) + DA(B+1)]$,
$\Delta H$ = change in humidity,
$t$ = total thickness of said element,
$\beta$ = coefficient of linear hygroscopic expansion,
$\alpha$ = coefficient of linear thermal expansion,
$Z = (DA^3 + B^3 + GC^3)(DA + B + GC)$,
$A = t_1/t$,
$B = t_2/t$,
$C = t_3/t$,
$D = E_1/E_2$,
$E$ = modulus of elasticity,
$G = E_3/E_2$,
numerical subscripts refer to particular laminations, whereby a predetermined change in curvature of said element is obtained for a given change in humidity without substantially any change in curvature in response to changes in ambient temperature.

8. The laminated element of claim 7 having said laminations proportioned as to the thicknesses thereof to obtain a maximum change in curvature for a given change in ambient humidity.

9. The laminated element of claim 7 in which laminations number 1 and 3 are formed of a plastic of the nylon family.

10. A laminated element for sensing changes in ambient humidity conditions, said element comprising two laminations arranged in surface-to-surface contact and secured together so that the laminations act as an integral whole, said laminations being formed of materials having substantially different coefficients of linear hygroscopic expansion so that in response to a change in the humidity of the ambient environment said element will deflect laterally, and means for compensating for the lateral deflection of said laminations in response to a change in temperature of the ambient environment, said last mentioned means comprising a third lamination arranged in surface-to-surface contact with and secured to one of said two laminations so that the three laminations act as an integral whole, said third lamination and the other of said two laminations being dimensionally proportioned relative to each other and relative to said one lamination so that changes in temperature of the ambient environment do not cause substantial lateral deflection of said one lamination.

11. The laminated element according to claim 10 in which said third lamination is secured to the one of said two laminations having the lowest coefficient of linear hygroscopic expansion.

12. The laminated element according to claim 11 in which said third lamination is formed of a non-hygroscopic material.

13. The laminated element according to claim 12 in which said three laminations are dimensionally proportioned such that for a given change in ambient humidity conditions, a substantially maximum lateral deflection of said element is obtained.

14. The laminated element according to claim 12 in which said three laminations are of the same lengths and widths.

15. The laminated element according to claim 10 in which said one of said two laminations and said third lamination are formed of metal and said other one of said two laminations is formed of a hygroscopic plastic material.

References Cited
UNITED STATES PATENTS

| | | | |
|---|---|---|---|
| 1,993,441 | 3/1935 | Goss | 72—337 |
| 2,573,685 | 11/1951 | Blinn et al. | 73—337 |

LOUIS R. PRINCE, *Primary Examiner.*

JEFFREY NOLTON, *Assistant Examiner.*

UNITED STATES PATENT OFFICE
CERTIFICATE OF CORRECTION

Patent No. 3,335,608  August 15, 1967

Clarence F. Alban et al.

It is hereby certified that error appears in the above numbered patent requiring correction and that the said Letters Patent should read as corrected below.

Column 1, line 42, for "may" read -- any --; column 2, line 58, for "force" read -- forces --; column 3, lines 24 and 25, for that portion of the formula reading $$t_2 + \frac{t_2}{2} \qquad \text{read} \qquad t_2 + \frac{t_3}{2}$$

column 4, line 22, for "H" read -- ΔH --; line 43, for "Band" read -- B and --; column 5, line 28, for "o rof" read -- or of --; column 6, line 11, for "huimidity" read -- humidity --.

Signed and sealed this 10th day of September 1968.

(SEAL)
Attest:

EDWARD M. FLETCHER, JR.
Attesting Officer

EDWARD J. BRENNER
Commissioner of Patents